United States Patent
Ohno et al.

(10) Patent No.: US 7,848,927 B2
(45) Date of Patent: *Dec. 7, 2010

(54) SPEECH RECOGNITION DEVICE AND METHOD OF RECOGNIZING SPEECH USING A LANGUAGE MODEL

(75) Inventors: Yoshio Ohno, Tokyo (JP); Makoto Nishizaki, Tokyo (JP); Shinichi Yoshizawa, Osaka (JP); Tetsu Suzuki, Osaka (JP)

(73) Assignee: Panasonic Corporation, Osaka (JP)

( * ) Notice: Subject to any disclaimer, the term of this patent is extended or adjusted under 35 U.S.C. 154(b) by 861 days.

This patent is subject to a terminal disclaimer.

(21) Appl. No.: 11/791,110

(22) PCT Filed: Nov. 1, 2005

(86) PCT No.: PCT/JP2005/020126

§ 371 (c)(1),
(2), (4) Date: May 21, 2007

(87) PCT Pub. No.: WO2006/059451

PCT Pub. Date: Jun. 8, 2006

(65) Prior Publication Data

US 2008/0046244 A1 Feb. 21, 2008

(30) Foreign Application Priority Data

Nov. 30, 2004 (JP) .............................. 2004-347420

(51) Int. Cl.
*G10L 15/14* (2006.01)
(52) U.S. Cl. ...................................................... 704/255
(58) Field of Classification Search ................. 704/255
See application file for complete search history.

(56) References Cited

U.S. PATENT DOCUMENTS 6,985,863 B2 * 1/2006 Itoh et al. .................... 704/257

(Continued)

FOREIGN PATENT DOCUMENTS

JP 2000-75892 3/2000

(Continued)

OTHER PUBLICATIONS

Shikano et al. "Onsei Ninshiki System" (Voice Recognition System) Ohmsha, Ltd., May 15, 2001, pp. 63 to 65.

*Primary Examiner*—Susan McFadden
(74) *Attorney, Agent, or Firm*—Wenderoth, Lind & Ponack, L.L.P.

(57) ABSTRACT

A speech recognition device is provided which includes: a language model storage unit which stores a language model indicating appearance probabilities of words or word sequences; an acoustic feature amount extracting unit and a checking unit which extract a feature amount of an inputted speech signal, and identifies the word or word sequence corresponding to the speech signal by checking the extracted feature amount with the language model stored in the language model storage unit; an obtained word signal receiving/analyzing unit which obtains and analyzes the word; and a language model adjusting unit which identifies the appearance probability of the word based on the time elapsed after obtaining the word by the obtained word signal receiving/analyzing unit and which adjusts the language model by reflecting the identified appearance probability on the language model stored in the language model storage unit.

7 Claims, 8 Drawing Sheets

U.S. PATENT DOCUMENTS

| | | | |
|---|---|---|---|
| 7,310,601 B2 * | 12/2007 | Nishizaki et al. | 704/240 |
| 7,711,560 B2 * | 5/2010 | Yamada et al. | 704/255 |
| 7,734,996 B2 * | 6/2010 | Hirata | 715/201 |

FOREIGN PATENT DOCUMENTS

| | | |
|---|---|---|
| JP | 2001-22374 | 1/2001 |
| JP | 2002-41078 | 2/2002 |
| JP | 3283359 | 5/2002 |
| JP | 2004-198831 | 7/2004 |

* cited by examiner

FIG. 2

| Obtained word ID | Obtained word | Auxiliary information | Post-obtainment elapsed time |
|---|---|---|---|
| 1 | Malph Lauren | Semantic category : Long-established brand name | 30 days 8 hours 15 minutes |
| 2 | Tamsonite | Semantic category : Long-established brand name | 30 days 8 hours 15 minutes |
| 3 | Ferragame | Semantic category : Long-established brand name | 30 days 8 hours 15 minutes |
| ... | ... | ... | ... |
| 31 | Malch Laurin | Semantic category : Weekly hit song title | 1 day 2 hours 30 minutes |
| 32 | Yugdorashiro | Semantic category : Weekly hit song title | 1 day 2 hours 30 minutes |
| 33 | Chujiro of Banjo | Semantic category : Weekly hit song title | 1 day 2 hours 30 minutes |
| ... | ... | ... | ... |

FIG. 6

| Obtained word ID | Obtained word | Auxiliary information | Post-obtainment elapsed time |
|---|---|---|---|
| 1 | General news | program name to be broadcasted during this week | 3 days 5 hours 45 minutes |
| 2 | Weather forecast | program name to be broadcasted during this week | 3 days 5 hours 45 minutes |
| ... | ... | ... | ... |
| 101 | Live professional baseball game | program name to be broadcasted during next week | 3 days 5 hours 45 minutes |
| 101 | Live professional baseball game | program name to be broadcasted during next week | 3 days 5 hours 45 minutes |
| ... | ... | ... | ... |
| 201 | Opening ceremony of the Olympics | program name to be broadcasted during next month | 3 days 5 hours 45 minutes |
| 202 | World soccer | program name to be broadcasted during next month | 3 days 5 hours 45 minutes |

# SPEECH RECOGNITION DEVICE AND METHOD OF RECOGNIZING SPEECH USING A LANGUAGE MODEL

TECHNICAL FIELD

The present invention relates to a speech recognition device which recognizes a speech signal of voice that is spoken and inputted by a user and which outputs a result of this recognition.

BACKGROUND ART

In recent years, an amount of information obtained by information appliances, such as car navigation systems and digital televisions, has been significantly increasing. For example, information, such as names of places and facilities in wider regions, is recorded in map databases referred by the car navigation systems. Furthermore, detailed program information of programs distributed through many channels, such as names of programs and cast members, is being distributed to electronic program guides (referred to as EPG hereinafter) for digital televisions. As interfaces for searching for such information, speech recognition techniques are notable.

However, the more the number of target words to be recognized increases, the lower the recognition ratio becomes in a speech recognition device. The speech recognition device is a device which stores, in a word dictionary, words, such as names of places, facilities, programs and cast members, and recognizes these words as target words. Furthermore, the speech recognition device obtains these target words via a communication means and stores them in a recognition dictionary. When the number of stored words reaches the maximum storage capacity of the recognition dictionary, there is a problem that it becomes impossible to obtain and store newly recognized words.

In order to solve such a problem, conventionally, various techniques have been suggested (for example, Patent References 1 and 2). FIG. 8 shows the configuration of the first conventional technique described in Patent Reference 1. The technique relates to a speech recognition device used in the operation of the EPG. As shown in FIG. 8, in the conventional speech recognition device, an EPG receiving unit 5 receives EPG data, and an item classifying unit 6 classifies the data into certain items. Then, a reading obtaining unit 7 refers to a kanji-to-kana conversion unit 15 and obtains the reading. Then, a dictionary updating unit 8 registers a pair of a word and the reading in a dictionary 9, and a registered word deleting unit 14 deletes the registered data, for example, the old data which has been registered by the preceding day. The words which newly appear in the EPG data (new programs and new cast members) are registered, and the items which have been registered and stored in the dictionary for a predetermined period of time are deleted. With such operations, it is possible to prevent the recognition ratio from being lowered due to the increase in the number of words stored in the recognition dictionary, and the amount of data stored in the dictionary from exceeding the limit and overflowing. Furthermore, it becomes possible to achieve the speech recognition processing using the dictionary in which the latest EPG data is reflected.

Furthermore, the second conventional technology described in Patent Reference 2 applies a speech recognition device for searching for names of places using a car navigation system installed in a vehicle. It has the configuration in which the names of places are recognized, using traffic information transmitted from traffic information transmitting units installed alongside roads (referred to as "beacons"). More specifically, a word indicating a name of a place in the vicinity of the vehicle (for example, a town name, an intersection name, road name, station name, a name of a structural object) is extracted, and such word is used as a target word to be recognized at the point in time. The traffic information transmitting unit provides detailed information of place names in the vicinity of a position where each of the unit is set. When the user moves by driving the vehicle and the current position of the user varies, the traffic information received by the traffic information transmitting unit is also updated to the one specifically for the vicinity of the current position. Then, the traffic information to be newly received by the traffic information transmitting unit includes place name information corresponding to the latest position information. With the aforementioned configuration, it is possible to achieve a speech recognition device which can prevent a recognition ratio of words from being lowered due to the increase in the number of words stored in a recognition dictionary and which can always recognize names of places in the vicinity of a current position as target words to be recognized.

Patent Reference 1: Japanese Laid-Open Patent Application No. 2001-22374

Patent Reference 2: Japanese Patent No. 3283359

DISCLOSURE OF INVENTION

Problems that Invention is to Solve

However, in the aforementioned first conventional technology, the items in the dictionary are deleted after the items have been registered in the dictionary and the predetermined time has been elapsed. Thus, when the predetermined time is elapsed, the words, such as names of programs and cast members, which have been able to be recognized up to predetermined time suddenly can not be recognized. Thus, when the user who utters the words can not recognize the deletion process of the items in the dictionary within the speech recognition device, there is a problem that the user can not understand why the words which have been able to be recognized up to the predetermined time suddenly can not be recognized and feels uncomfortable with the odd operation of the speech recognition device.

Furthermore, in the aforementioned second conventional technology, the traffic information transmitting unit is switched over according to the change in the current position of the user by driving the vehicle, and then, words of place names extracted from the traffic information are also replaced accordingly. Thus, there are problems that place names, such as a town name and a name of a main structural object suddenly can not be recognized, and the user feels uncomfortable with the odd operation of the speech recognition device as shown in the first conventional technology.

In other words, the first and second conventional technologies have an objective to prevent lowering of a recognition ratio of words due to the increase in the number of target words to be recognized. As a result of limiting the number of the target words to be recognized, the speech recognition device performs the odd operation that the words which have been recognized up to a certain point in time suddenly can not be recognized, and the user feels uncomfortable with the odd operation of the speech recognition device. When such uncomfortable feeling significantly increases, there is a problem that the user finally gives up using the speech recognition device and can not benefit from the speech recognition device.

The object of the present invention is to solve the aforementioned problems, and to provide a speech recognition device which recognizes, as target words to be recognized, words including names of places, facilities, programs, and cast members and which appropriately applies limitations on the aforementioned target words as well as eliminates uncomfortable feeling of the user caused by the limitation process.

Means to Solve the Problems

In order to achieve the aforementioned object, the speech recognition device according to the present invention is a speech recognition device which recognizes a speech signal and outputs a result of the recognition, and the speech recognition device includes: a language model storage unit which stores a language model indicating appearance probabilities of words or word sequences; a recognition unit which extracts a feature amount of the inputted speech signal, identifies a word or word sequence corresponding to the speech signal by checking the extracted feature amount with the language model stored in the language model storage unit, and outputs the identified word or word sequence as the result of the speech recognition; a word obtaining unit which obtains a word from outside the speech recognition device; and a language model adjusting unit which adjusts the language model by varying the appearance probability indicated by the language model according to time elapsed after the word obtaining unit obtains the word, wherein the recognition unit identifies the word or the word sequence using the language model adjusted by the language model adjusting unit. With this, it becomes possible to vary the appearance probability of the word according to the elapsed time, and to prevent the malfunction in which the word, which has been able to be recognized right before the recognition, suddenly can not be recognized after a certain period by appropriately limiting the word to be recognized.

More specifically, it is possible that the word obtaining unit obtains auxiliary information indicating an auxiliary item to be attached to the word, together with the word, and the language model adjusting unit includes: a word appearance probability time characteristic storage unit which stores, for each auxiliary information, a time characteristic of a word appearance probability which indicates how the word appearance probability of the word varies according to time elapsed after obtaining the word; a word storage unit which stores the word and the corresponding auxiliary information in association with each other, the word being obtained by the word obtaining unit; an elapsed time measurement unit which measures, for each word, time elapsed after the word obtaining unit obtains the word; and an adjusting unit which identifies, from the time characteristics stored in the word appearance probability time characteristic storage unit, a time characteristic corresponding to the auxiliary information of the word stored in the word obtaining unit, identifies a word appearance probability corresponding to the elapsed time of the word measured by the elapsed time measurement unit, using the identified time characteristic of the word appearance probability, and adjusts the language model, using the identified appearance probability.

Note that, for example, the N-gram language model is used as the language model, and the adjusting unit may adjust the language model by registering the appearance probability of the identified word in the language model storage unit as a parameter used to obtain the appearance probability of the word in the N-gram language model. For example, it is conceivable that the word appearance probability of the word which is identified from the corresponding elapsed time can be reflected as a unigram value.

Furthermore, it is possible that the word obtaining unit obtains information indicating a semantic category of the word as auxiliary information of the word, and the language model adjusting unit varies the appearance probability indicated by the language model for each semantic category indicated by the auxiliary information. With this, it is possible to classify trendy words which are used for a short period of time and words which are continuously used for a relatively long period of time, depending of each of the semantic categories and the places where the words have been obtained so that the time characteristic of the word appearance probability can be used according to the characteristic of the word and the obtaining place. As such, it becomes possible to adjust the language model in which a realistic situation is reflected.

Furthermore, it is possible to provide, in the speech recognition device, a word appearance probability time characteristic obtaining unit which obtains a time characteristic of a word appearance probability from outside the speech recognition device, and stores the obtained time characteristic in the word appearance probability time characteristic storage unit. With this, it becomes possible to update the time characteristic that has been used to a more appropriate one, and to adjust the language model using the time characteristic which has been classified in details, which enables natural speech recognition.

Furthermore, when the identified word appearance probability of the word is less than a predetermined value, it is possible that the adjusting unit deletes one of or all of: the words stored in the word storage unit; the auxiliary information of the words; the elapsed time of the words stored in the elapsed time measurement unit; and the language model of the words stored in the language model storage unit. With this, the word which is seldom used can be deleted from each storage unit, and it is possible to prevent the malfunction that the unnecessary word occupies the storage space in the storage unit.

Furthermore, the variation of the appearance probability indicated by the language model may be expressed by a curve which smoothly varies (for example, decreases) according to the elapsed time or a curve which is peaked after a predetermined time has elapsed. With this, it is possible to ensure that the appearance probability of the word continuously varies according to the elapsed time. Furthermore, while limiting the words to be recognized more appropriately, it is possible to eliminate the uncomfortable feeling of the user caused by limiting the words to be recognized.

Moreover, the present invention can be realized, not only as the aforementioned speech recognition device, but also as a speech recognition method, as a program causing a computer to execute such speech recognition method, and as a recording medium in which such program is recorded, such as a CD-ROM and the like.

Effects of the Invention

With the speech recognition device of the present invention, it is possible to adjust a word appearance probability indicated by a language model based on the auxiliary information of an obtained word, continuously according to elapsed time. Furthermore, while limiting the words to be recognized more appropriately, it is possible to eliminate the uncomfortable feeling of the user caused by limiting the words to be recognized.

Thus, the present invention is highly practical as a speech recognition device for a digital television which installs a recognition dictionary which is easy to reach capacity and which depends on the latest fashions, and as a speech recognition device in a shop where the fashion products are sold.

BRIEF DESCRIPTION OF DRAWINGS

FIG. 2 is a diagram showing an example of obtained words, the auxiliary information, and the post-obtainment elapsed time in the speech recognition device according to the first embodiment of the present invention.

FIG. 6 is a diagram showing an example of obtained words, the auxiliary information, and the post-obtainment elapsed time in the speech recognition device according to the second embodiment of the present invention.

NUMERICAL REFERENCES

Figure 1:
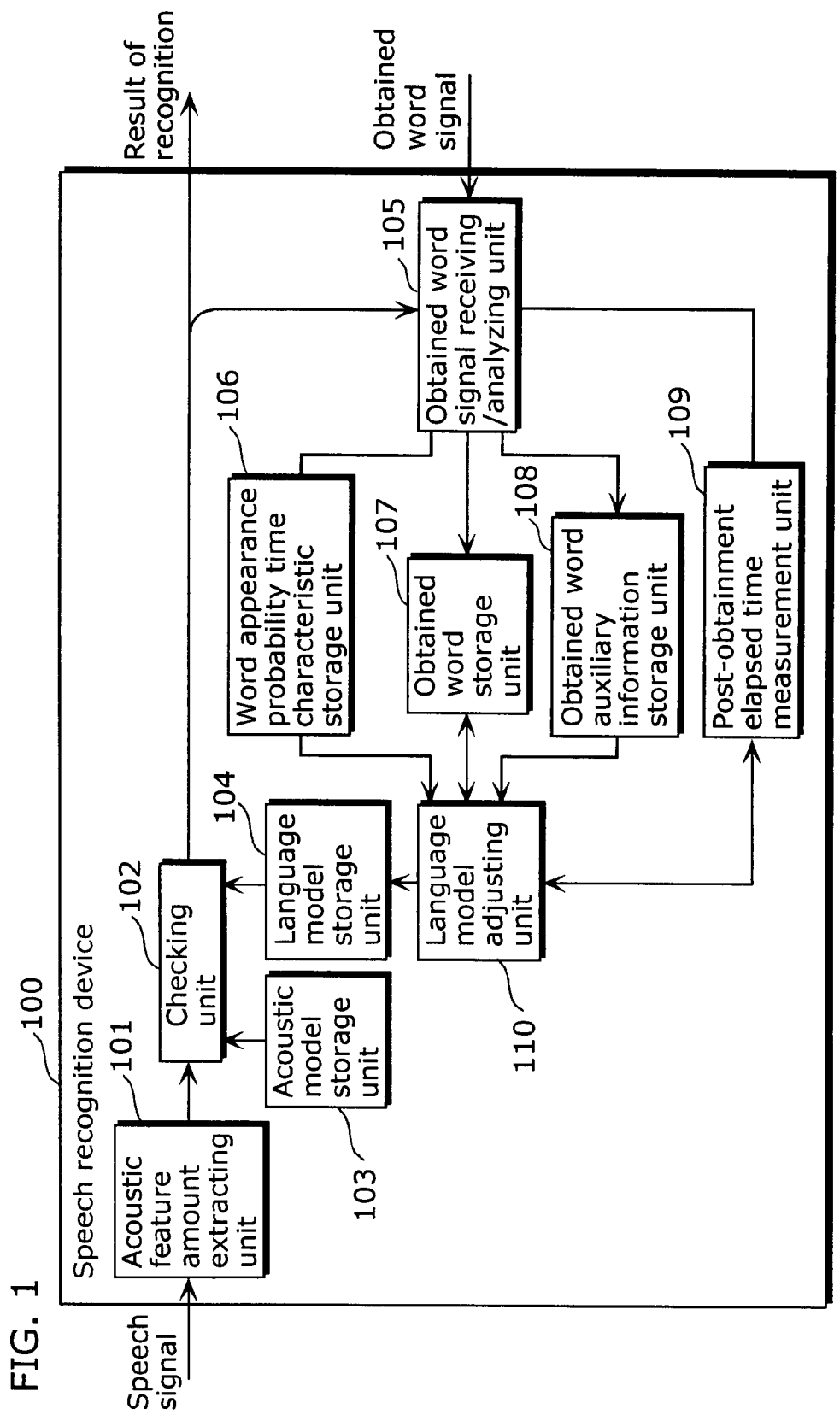
FIG. 1 is a block diagram showing the configuration of the speech recognition device according to the first embodiment of the present invention.

101 Acoustic feature amount extracting unit
102 Checking unit
103 Acoustic model storage unit
104 Language model storage unit
105 Obtained word signal receiving/analyzing unit
106 Word appearance probability time characteristic storage unit
107 Obtained word storage unit
108 Obtained word auxiliary information storage unit
109 Post-obtainment elapsed time measurement unit
110 Language model adjusting unit

BEST MODE FOR CARRYING OUT THE INVENTION

The embodiments of the present invention are described with the reference to the diagrams.

First Embodiment

The speech recognition device according to the first embodiment is described using FIGS. 1 to 5. The speech recognition device according to the first embodiment is, for example, embedded in an information terminal that the user carries, and is applied to uses, such as information search for the user who shops in a shop and audio assisted interpretation. Furthermore, the speech recognition device recognizes speech uttered by the user for inquiring preferred products. This speech recognition device obtains a word to be adjusted as a language model from outside the speech recognition device via wireless communication and the like. It is assumed that the device obtains a product name and a brand name of a product in each shop. For example, when the user enters a shop, information is provided to the information terminal of the user via wireless communication and the like from an information providing server installed in the shop.

FIG. 1 is a diagram showing the configuration of the speech recognition device according to the first embodiment of the present invention. As shown in FIG. 1, a speech recognition device 100 according to the first embodiment is a speech recognition device which can continuously adjust a word appearance probability of a target word to be recognized, which is indicated by a language model according to the elapsed time. It includes: an acoustic feature amount extracting unit 101; a checking unit 102; an acoustic model storage unit 103; a language model storage unit 104; an obtained word signal receiving/analyzing unit 105; a word appearance probability time characteristic storage unit 106; an obtained word storage unit 107; an obtained word auxiliary information storage unit 108; a post-obtainment elapsed time measurement unit 109; and a language model adjusting unit 110.

The acoustic feature amount extracting unit 101 extracts an acoustic feature amount indicating a feature of a speech signal from the speech signal inputted in the speech recognition device 100, and transmits the feature amount to the checking unit 102. This acoustic feature amount extracting unit 101 includes, for example: a microphone which collects sound including speech signals; an A/D converter which converts the speech signal into a digital signal with a sampling frequency of 12 kHz and A/D converting precision of 16 bit; and an acoustic feature calculating unit which calculates, from the digital signal of the inputted speech, an acoustic feature amount, such as a spectrum and a cepstrum which respectively indicates a feature of the speech. As a calculation method used in the acoustic feature calculating unit, for example, it is conceivable to use an MFCC analytical method. Furthermore, as an acoustic feature amount extracted by the acoustic feature amount extracting unit 101, it is conceivable to use an acoustic feature amount composed of 16th order MFCC coefficients, 16th order $\Delta$MFCC coefficients, and a 1st order $\Delta$power.

The acoustic model storage unit 103 is a memory and the like which stores, in advance, an acoustic model, in other words, data indicating a pattern of speech which is prepared in advance per speech unit, such as a word. The Hidden Markov Model (HMM) which is generally used for speech recognition can be used as the aforementioned stored acoustic model. For example, 3 states left-to-right/4 Gaussian mixture/continuous density/HMMs are learned in advance from learning speech data, and the models are stored in the acoustic model storage unit 103.

The language model storage unit 104 is a memory and the like which stores, in advance, a language model, in other words, data indicating a linguistic characteristic, such as a word sequence which constitutes a sentence. For example, the language model storage unit 104 stores a language model indicating word appearance probabilities of words or word sequences. The language model may be an N-gram language model in which occurrence of a word is approximated in the (n−1)th order Markov process, such as language models of unigram, bigram, and trigram. Note that known speech recognition processing methods can be used as the speech recognition processing method based on an acoustic model using the aforementioned HMMs and a language model using the aforementioned N-gram language model (for example, refer to "Speech/acoustic information digital signal processing", Kiyohiro Shikano, Satoshi Nakamura, Shiro Ise, Shokodo Co., Ltd., P. 63-121, November 1997).

The checking unit 102 checks the acoustic feature amount extracted by the acoustic feature amount extracting unit 101 with the acoustic model stored in the acoustic model storage unit 103 and the language model stored in the language model storage unit 104, and outputs a word or a word sequence showing the highest similarity to the aforementioned models as a result of the speech recognition. For example, the checking unit 102 outputs, as a result of recognition, a word or a word sequence showing the highest value obtained by multiplying the probability identified from the acoustic model stored in the acoustic model storage unit 103 and the probability identified from the language model stored in the language model storage unit 104.

The obtained word signal receiving/analyzing unit 105 is a processing unit which obtains a word from outside the speech recognition device 100. More specifically, it receives an obtained word signal including the recognized word and the auxiliary information of the word, and analyzes the signal. With this, for example, when the optical beacon information transmitting apparatus installed in each shop transmits the obtained word signal, the optical beacon information transmitting apparatus performs a receiving function in the obtained word signal receiving/analyzing unit 105. After receiving the obtained word signal, the obtained word signal receiving/analyzing unit 105 extracts, through the analysis of the signal, the obtained word and the auxiliary information of the obtained word including information, such as the semantic category and the place where the word has been obtained. Here, in the case where the shop where the user stops by is a clothing shop, the obtained word is the word related to shopping at the clothing shop. For example, the obtained word is a long-established brand name among words of products dealt in clothing shops, such as "Malph Lauren", "Tamsonite", and "Ferragame". The auxiliary information of the obtained word is information indicating that the "semantic category" is "long-established clothing brand name". After receiving the obtained word signal, this obtained word signal receiving/analyzing unit 105 stores the extracted word in the obtained word storage unit 107 and the auxiliary information of the obtained word in the obtained word auxiliary information storage unit 108. Furthermore, when receiving the obtained word signal, the obtained word signal receiving/analyzing unit 105 obtains the word obtainment time signal indicating the time when the word has been obtained, and transmits the time to the post-obtainment elapsed time measurement unit 109. The post-obtainment elapsed time measurement unit 109 measures the elapsed time after obtaining the word based on the word obtainment time signal, and holds it as the post-obtainment elapsed time.

FIG. 2 specifically shows an example of obtained words stored in the obtained word storage unit 107, each of the auxiliary information stored in the obtained word auxiliary information storage unit 108, and each of the post-obtainment elapsed time which is measured and held by the post-obtainment elapsed time measurement unit 109. Here, the auxiliary information and the elapsed time corresponding to each word are stored in association with the obtained word by allocating an ID number for each word. For example, the obtained word, the auxiliary information, and the post-obtainment elapsed time which correspond to the ID number "1" are respectively "Malph Lauren", "semantic category: long-established brand name", and "30 days 8 hours 15 minutes". Other words obtained though the obtained word signal receiving/analyzing unit 105 are respectively associated with the obtained words, the auxiliary information, and the post-obtainment elapsed time. Furthermore, they are respectively stored in the obtained word storage unit 107, the obtained word auxiliary information storage unit 108, and the post-obtainment elapsed time measurement unit 109.

Figure 3:
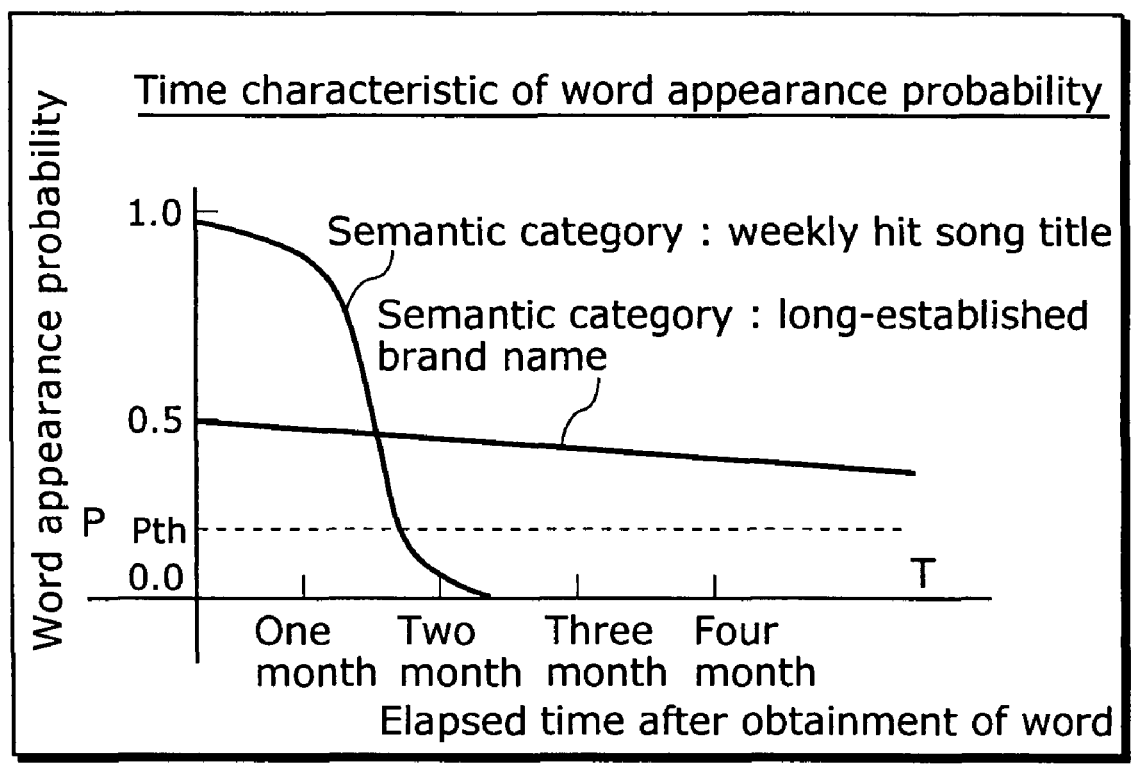
FIG. 3 is a diagram showing an example of the time characteristics stored in the word appearance probability time characteristic storage unit in the speech recognition device according to the first embodiment of the present invention.

The word appearance probability time characteristic storage unit 106 is a memory and the like which stores, in advance, information indicating the time characteristic of the word appearance probability for each auxiliary information of the obtained word. FIG. 3 shows an example of the time characteristic of the word appearance probability stored in the word appearance probability time characteristic storage unit. The time characteristic of a word appearance probability is defined per semantic category and shows a relationship between the word appearance probability and the post-obtainment elapsed time. For example, in the diagram, a straight line, a smooth curve or the like indicates a word appearance probability which is being decreased according to the time elapsed after obtaining the word. For example, a word which belongs to a group of a long-established brand name which is referred to as a brand name, is a word which is continuously uttered relatively for a long time even after obtaining the word. Thus, the time characteristic of the word appearance probability of a word which belongs to the auxiliary information "semantic category: brand name" has a characteristic that the dependency on the time elapsed after obtaining the word is low and that is smoothly attenuated. On the other hand, a word which belongs to a group of song titles, in particular, titles of weekly hit songs defined based on the number of music CDs sold for a certain week is the word having a characteristic in which an utterance frequency is rapidly decreased in several weeks after obtaining the word. Thus, the time characteristic of the word appearance probability of the word which belongs to the auxiliary information "semantic category: weekly hit song title" has a characteristic that the dependency on the post-obtainment elapsed time is high and that is rapidly attenuated in several weeks after obtaining the word. Here, for example, as a setting method of a time characteristic of a word appearance probability for each semantic category, it is possible to set it by referring to the statistic indicating the fluctuations of the sales of a product which belongs to the same type of the category in the past.

The language model adjusting unit 110 is a processing unit which adjusts a language model by varying an appearance probability of a word or a word sequence according to the time elapsed after obtaining the word. More specifically, the language model adjusting unit 110 obtains the appearance probability of the corresponding word based on the obtained word stored in the obtained word storage unit 107, the auxiliary information stored in the obtained word auxiliary information storage unit 108, the post-obtainment elapsed time obtained by the post-obtainment elapsed time measurement unit 109, and the word appearance probability time characteristic stored in the word appearance probability time characteristic storage unit 106. Then, it adjusts, based on the obtained word appearance probability, the language model in association with the corresponding word. In other words, the language model adjusting unit 110 identifies the time characteristic corresponding to the auxiliary information of the word stored in the obtained word storage unit 107, from among the time characteristics stored in the word appearance probability time characteristic storage unit 106. In the present embodiment, as shown in FIG. 3, the word appearance probability time characteristic storage unit 106 stores a characteristic in which word appearance probability decreases according to the time elapsed after obtaining the word. Thus, this language model adjusting unit 110 adjusts the language model by varying it so as to decrease the word appearance probability according to the time elapsed after obtaining the word.

Note that the relationship between the units in the claims and the units in the present embodiment is described as follows. In other words: the language model storage unit in the claims corresponds to the acoustic model storage unit 103; the recognition unit corresponds to the combination of the acoustic feature amount extracting unit 101, the checking unit 102, and the acoustic model storage unit 103; the word obtaining unit corresponds to the obtained word signal receiving/analyzing unit 105; and the language model adjusting unit corresponds to the combination of the word appearance probability time characteristic storage unit 106, the obtained word storage unit 107, the obtained word auxiliary information storage unit 108, the post-obtainment elapsed time measurement unit 109, and the language model adjusting unit 110.

Next, the operation of the speech recognition device 100 with the aforementioned configuration according to the present embodiment is described.

Figure 4:
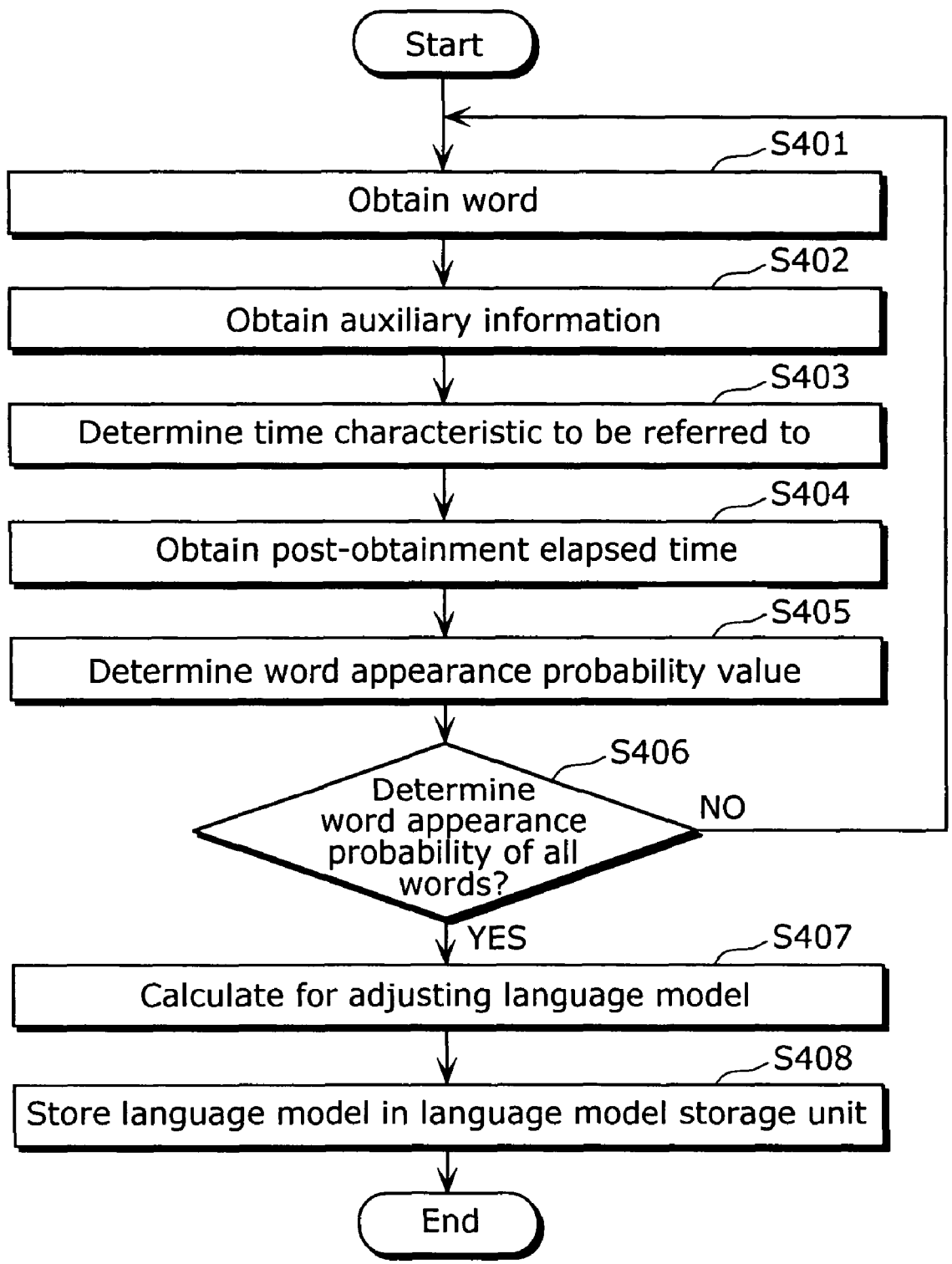
FIG. 4 is a flowchart showing an example of the operation of adjusting a language model in the speech recognition device according to the first embodiment of the present invention.

FIG. 4 is a flowchart showing the operation of adjusting a language model using the language model adjusting unit 110 of the speech recognition device 100. First, the language model adjusting unit 110: obtains a certain word from the obtained word storage unit 107 (S401); obtains the auxiliary information of the obtained word from the obtained word auxiliary information storage unit 108 (S402); and determines, based on the auxiliary information of the obtained word, which time characteristic should be referred to from among the time characteristics stored in the word appearance probability time characteristic storage unit 106 (S403). For example, the language model adjusting unit 110 identifies a time characteristic corresponding to the semantic category indicated by the obtained auxiliary information of a word.

Furthermore, the language model adjusting unit 110 obtains the post-obtainment elapsed time corresponding to the obtained word from the post-obtainment elapsed time measurement unit 109 (S404), and determines the word appearance probability according to the elapsed time of the word based on the time characteristic which has been previously determined, as the word appearance probability value of the obtained word at the current point in time (S405). The language model adjusting unit 110 performs the same processing on all of other necessary obtained words stored in the obtained word storage unit 107, and determines each of the word appearance probability values of the obtained words at the current point in time (S406)

Then, the language model adjusting unit 110 adjusts, based on the word appearance probability, the language model used for the speech recognition processing (S407). In other words, the language model adjusting unit 110 determines a parameter of the language model so as to perform speech recognition on a target word with the identified word appearance probability. As a specific method of adjusting the language model, for example, it is conceivable to calculate, based on the word appearance probability, the unigram when N=1 which is one of the N-gram language models in which occurrence of a word is approximated in the (n−1)th order Markov process. Note that the aforementioned N-gram language models can be generated using the known generation methods (for example, refer to "Spoken language processing", Kenji Kita, Satoshi Nakamura, Masaaki Nagata, Morikita Publishing Co., Ltd., P. 27-37, November, 1996).

Finally, the language model adjusting unit 110 adjusts the language model related to the word calculated from the word appearance probability value at the current point in time, and transmits the language model to the language model storage unit 104. Then, the language model storage unit 104 stores the model (S408).

After the adjusted language model is stored in the language model storage unit 104, the checking unit 102 performs the check using the adjusted language model, in other words, performs the speech recognition using the adjusted language model. With this, speech recognition is performed on a newly obtained word based on the time elapsed after obtaining the word, and the natural speech recognition can be achieved without giving any uncomfortable feeling to the user.

Next, a specific example of adjusting a language model using the language model adjusting unit 110 is described. Here, an example is a case where the N-gram model is used as the language model.

(1) The first adjustment example uses, as a unigram value (probability) of the N-gram language model, the word appearance probability identified by the language model adjusting unit 110.

Let "$w_1, w_2, \ldots, w_n$" be words respectively, and P ($w_1, w_2, \ldots, w_n$) be an appearance probability of a word sequence (linguistic expression) "$w_1, w_2, \ldots, w_n$". For example, in the case of the unigram model, the appearance probability P (Kore wa Malph Lauren desu ka) of the linguistic expression "Kore wa Malph Lauren desu ka" can be indicated by a result of multiplying appearance probabilities (unigram values) of each word as follows.

$$P(\text{Kore wa Malph Lauren desu ka}) = P(\text{Kore})P(\text{wa})P(\text{Malph Lauren})P(\text{desu})P(\text{ka})$$

In the first adjustment example, the word appearance probability of "Malph Lauren" identified by the language model adjusting unit 110 is stored in the language model storage unit 104 as the aforementioned unigram value P (Malph Lauren).

(2) The second adjustment example uses the word appearance probability identified by the language model adjusting unit 110, as a bigram value or linear interpolation for predicting a higher-order N-gram value.

In the bigram model, for example, the appearance probability P (Kore wa Malph Lauren desu ka) of the linguistic expression "Kore wa Malph Lauren desu ka" can be indicated by a result of multiplying appearance probabilities (bigram values) of two consecutive words as follows.

$$P(\text{Kore wa Malph Lauren desu ka}) = \\ P(\text{Kore}|\text{"beginning of a sentence"})P(\text{wa}|\text{kore}) \\ P(\text{Malph Lauren}|\text{wa})P(\text{desu}|\text{Malph Lauren}) \\ P(\text{ka}|\text{desu})$$

Note that P(Kore| "beginning of a sentence") indicates a probability when a word "kore" appears at the beginning of a sentence. P(wa|kore) indicates a probability when a word "wa" which follows the word "kore" appears, and P(Malph Lauren|wa) indicates a probability when a word "Malph Lauren" which follows the word "wa" appears (other word sets indicate the same).

Generally, when P ($w_1, w_2, \ldots, w_n$) is predicted using the N-gram model, the following approximation is made.

$$P(w_1 w_2 \ldots w_n) = \prod_{i=1}^{n} P(w_i | w_{i-N+1} \ldots w_{i-1}) \quad \text{[Equation 1]}$$

Here, the N-gram model is assumed to be: a unigram model when N=1; a bigram model when N=2; or a trigram model when N=3.

When an N-gram model is predicted from learning samples, in the case where the number of sample expressions including words which appear in the learning samples is small, there are cases where linear interpolation is performed using a low-order M gram value (M<N) as shown in the following equation so as to improve the precision of predicting the N-gram value.

$$P(w_n|w_{n-N+1}^{n-1}) = \lambda P_{ML}(w_n|w_{n-N+1}^{n-1}) + (1-\lambda) P(w_n|w_{n-N+2}^{n-1})$$

[Equation 2]

Here, the left-hand side of the aforementioned equation indicates the N-gram value of the word $w_n$. The first term of the right-hand side indicates a value obtained by multiplying the N-gram value predicted from the actual sample data and a mixing coefficient $\lambda (0 \leq \lambda \leq 1)$, and the second term of the right-hand side indicates a value obtained by multiplying the (N−1)gram value and a mixing coefficient $(1-\lambda)$.

For example, in the case where linear interpolation is performed on a bigram value using a unigram value, the following approximation is used.

$$P(w_n|w_{n-1}) = \lambda P_{ML}(w_n|w_{n-1}) + (1-\lambda) P(w_n)$$

[Equation 3]

In this second adjustment example, the word appearance probability identified by the language model adjusting unit 110 is used as the unigram value $P(w_n)$ of the aforementioned equation. With this, it becomes possible to adjust the language model corresponding to a bigram or a higher-order N-gram model.

(3) The third adjustment example uses the word appearance probability identified by the language model adjusting unit 110 as the word appearance probability of a word which belongs to a class equivalent to the N-gram class model.

Here, the N-gram class model is a name of a model which has been named by introducing a concept of a class "word class" in the N-gram model. As such classes, there are a parse and a word group into which words are categorized per semantic category. Assume that the class to which the word "$w_n$" belongs is $c_n$, the N-gram class model is defined by the following equation.

$$P(w_n|w_1^{n-1}) = P(w_n|c_n) P(c_n|c_{n-N+1}^{n-1})$$

[Equation 4]

Here, the left-hand side of the aforementioned equation indicates the N-gram value of the word $w_n$. The first term of the right-hand side indicates a probability of the word $w_n$ obtained according to the class $c_n$. Furthermore, as shown in the following equation, $P(w_n|c_n)$ is the value obtained by dividing the number of the appearance of $C(w_n)$ appeared in the learning data by the number $C(c_n)$ of the appearance of a word at the class $c_n$. The second term of the right-hand side indicates an N-gram value intended for the class.

$$P(w_n|c_n) = \frac{C(w_n)}{C(c_n)}$$

[Equation 5]

As the third adjustment example, the language model adjusting unit 110 determines the aforementioned probability $P(w_n|c_n)$ by calculating a ratio between the identified word appearance probability value and the word appearance probability value of the word which belongs to the same class, and stores the probability P in the language model storage unit 104. With this, it is possible to adjust the language model corresponding to the N-gram class model.

Next, a specific example of the operation of the speech recognition device according to the present embodiment is described. Here, an example is described when the user utters the word of the word ID 1 "Malph Lauren" shown in FIG. 2 and a word "Malph Laurin" having an intermediate acoustic feature with the word of the word ID 31 "Malch Laurin" respectively at different times, T1 and T2. Note that the language model of the speech recognition device is a unigram based on a word appearance probability, and the speech recognition device performs recognition on a single word. Furthermore, it is assumed that the obtained words, the auxiliary information, and the time characteristics of word appearance probabilities are in a state as shown in FIGS. 2 and 3.

It is assumed that the elapsed time T1 after a word is first uttered is the time shown in FIG. 2. In other words, T1 indicates that "30 days 8 hours 15 minutes" has elapsed since the optical beacon information transmitting apparatus installed at an entrance of a clothing shop obtains a word which belongs to the semantic category "long-established brand name", and "1 day 2 hours 30 minutes" has elapsed since the optical beacon information transmitting apparatus installed at an entrance of a music CD shop obtains a word which belongs to the semantic category "weekly hit song title". In this case, it is highly possible that the utterance "Malph Laurin" may be the voice of the user who entered the music CD shop one day ago. In the case where the acoustic feature of the utterance "Malph Laurin" has similar features with the word ID 1 "Malph Lauren" and the word ID 31 "Malch Laurin", the word appearance probability of the semantic category of "weekly hit song title" at the time T1 is higher than that of the semantic category "long-established brand name" (FIG. 3). Thus, the speech recognition device 100 according to the present embodiment outputs "Malch Laurin" which belongs to the semantic category "weekly hit song title" as the result of word recognition.

Next, it is assumed that the second utterance is performed at the time T2 after 60 days has elapsed since the first utterance time T1. At this time, as equal to or more than 60 days have elapsed since obtaining the word which belongs to the semantic category "weekly hit song title" at the music CD shop where the user has stopped by. It is less likely that the utterance of the user is related to the music CD shop. At this time, in the case where the acoustic feature of the second utterance has similar features with the word ID 1 "Malph Lauren" and the word ID 31 "Malch Laurin" as in the first utterance, the word appearance probability value of the semantic category of "long-established brand name" is higher than that of the semantic category "weekly hit song title" (FIG. 3). Thus, the speech recognition device 100 outputs "Malph Lauren" which belongs to the semantic category "long-established brand name" as the result of word recognition. After obtaining the words, such as "long-established brand name" and "weekly hit song title", during the period between the time T1 and T2, it is possible to adjust the language model continuously and to limit the words to be recognized more appropriately based on the time characteristic defined per auxiliary information of the respective obtained words.

With this, by continuously adjusting a word appearance probability indicated by a language model according to the elapsed time, it is possible to prevent a word which has been recognized up to a certain time from not being recognized suddenly as shown in the conventional technology. Furthermore, it becomes possible to limit words to be recognized more appropriately, and to eliminate the uncomfortable feeling of the user caused by limiting the words to be recognized.

Figure 5:
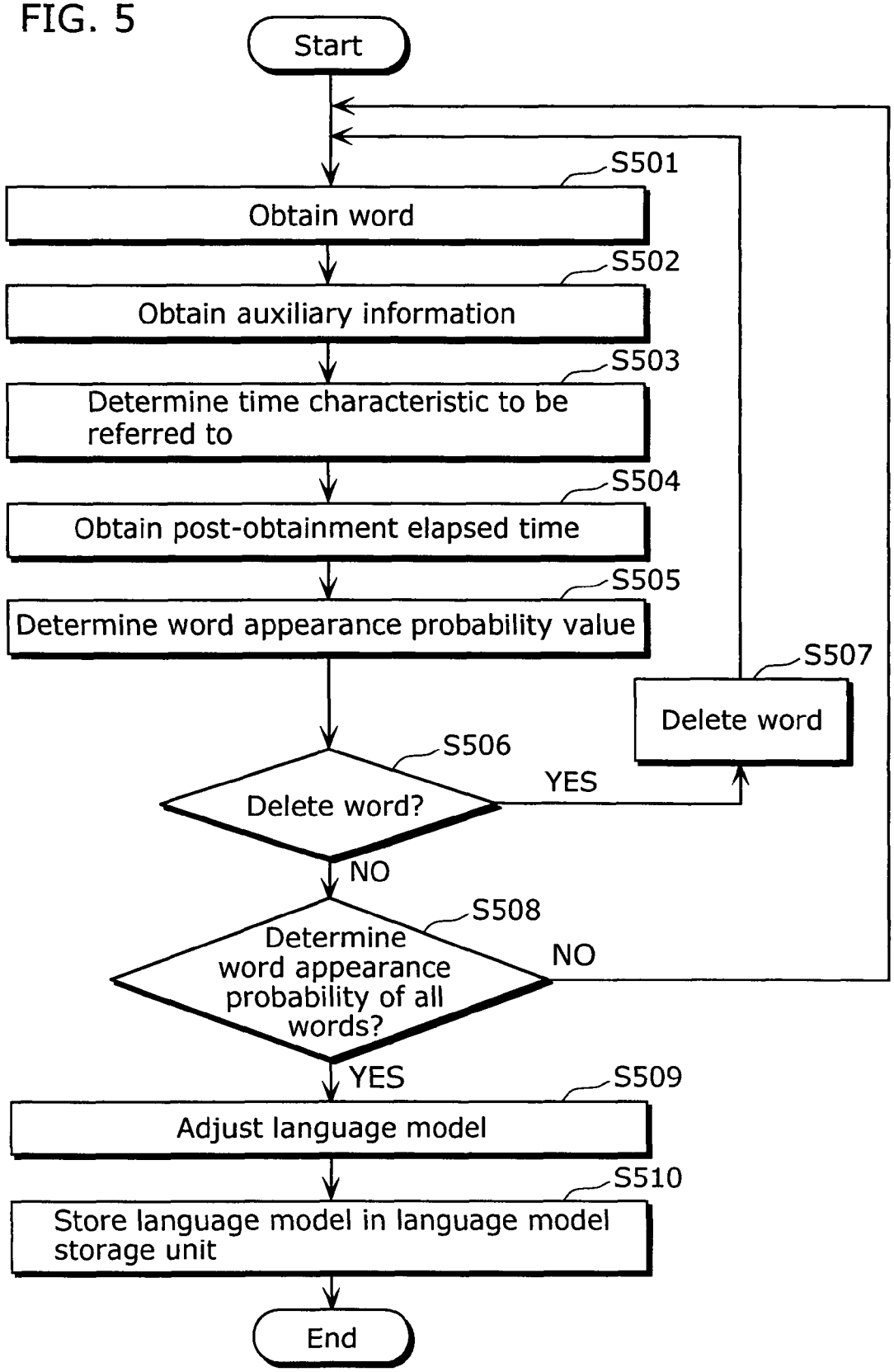
FIG. 5 is a flowchart showing an example of the operation of adjusting a language model in the speech recognition device according to the first embodiment of the present invention.

Note that at the time T2, when the time characteristic value of a word appearance probability corresponding to a word which belongs to the semantic category "weekly hit song title" is sufficiently low, for example, less than a predetermined value, such as a threshold value Pth in FIG. 2, the language model adjusting unit 110 may delete the word which belongs to the semantic category "weekly hit song title" from the obtained words stored in the obtained word storage unit 107, and further delete the auxiliary information, the elapsed time, and the language model which are related to the word. FIG. 5 show the flow of adjustment process in which such deletion of the word is performed. The flow from obtaining the word (S501) to determining the word appearance probability value (S505) is the same as the flow from Step S401 to S405 shown in FIG. 4. When the determined word appearance probability value is less than the threshold value Pth, the language model adjusting unit 110 determines to delete the word (S506), and performs the word deletion process (S507). When the determined word appearance probability value is higher than the threshold value Pth, the language model adjusting unit 110 determines not to perform the word deletion process of the word (S506), and performs the aforementioned processing on all words. Then, the language model adjusting unit 110 adjusts the language model (S509), and stores it in the language model storage unit 104 (S508). By deleting the obtained word, the auxiliary information of the word, the elapsed time, and the language model, it becomes possible to efficiently use the storage unit in the speech recognition device.

As such, the speech recognition device 100 of the first embodiment can continuously adjust a word appearance probability indicated by a language model based on the time characteristic defined per auxiliary information of each obtained word, with the configuration including the obtained word signal receiving/analyzing unit 105, the word appearance probability time characteristic storage unit 106, the obtained word storage unit 107, the obtained word auxiliary information storage unit 108, the post-obtainment elapsed time measurement unit 109, and the language model adjusting unit 110. By appropriately limiting words to be recognized, it is possible to achieve the speech recognition device that can eliminate the uncomfortable feeling of the user caused by limiting the words to be recognized.

Note that although in the first embodiment, an example is described that a signal of the word obtained by the obtained word signal receiving/analyzing unit 105 is obtained using the optical beacon information transmitting apparatus, it is possible to obtain it via a television broadcasting network, an Internet network, an RF-ID, and the like.

Furthermore, although in the first embodiment, it is assumed that a word is obtained and stored in the speech recognition device only when three elements of an obtained word, the auxiliary information, and the post-obtainment elapsed time are all set. Under the aforementioned state, when the auxiliary information can not be obtained for a certain word, for example, it is possible to predict the auxiliary information, such as the semantic category of the word, from the speech recognition result. By storing it in the obtained word auxiliary information storage unit 108 as the auxiliary information, the language model adjusted by this information may be used for the next speech recognition.

Furthermore, it is assumed, in the first embodiment, that the word appearance probability time characteristic storage unit 106 stores, in advance, a time characteristic of a word appearance probability corresponding to a word. However, when the word appearance probability time characteristic storage unit 106 does not store, in advance, such a time characteristic corresponding to the auxiliary information, it is possible to obtain the time characteristic from outside the speech recognition device via the obtained word signal receiving/analyzing unit. Furthermore, even when the time characteristic corresponding to the auxiliary information of the word is stored in advance in the word appearance probability time characteristic storage unit 106, in the case where the time characteristics can be obtained from outside the recognition device via the obtained word signal receiving/analyzing unit, it is possible to replace the word appearance probability time characteristic stored in advance with the newly obtained time characteristic and to update the information.

Furthermore, it is assumed, in the first embodiment, that the time characteristic is learned based on a characteristic of an elapsed time which indicates fluctuations of the sales of a product which belongs to the same type of the category in the past. Other than that, it is possible to learn a time characteristic of a word appearance probability based on the time characteristics of words which appear in the media, such as a newspaper, a television and the like.

Furthermore, the first embodiment is described using an example of referring to a "semantic category" of a word as auxiliary information which defines a time characteristic of a word appearance probability. Other than that, information regarding an obtained state of a word, such as a "place where a word is obtained" may be used as auxiliary information. For example, when the details of auxiliary information include information indicating that "place where a word is obtained" is "an entrance of a theme park" and the obtained words include names of facilities in the theme park and the related character names, it is conceivable that the user stays at an amusement park for several days at most. Thus, the obtained word has a characteristic that is attenuated approximately after three days have elapsed. When the auxiliary information includes information indicating that "place where a word is obtained" is "arrival gate of an international airport", and the obtained word is, for example, a tourist destination, a name of a local dish, or a currency unit which depends on the country where the user arrives at, it is conceivable that the user stays for several months at most, considering from the valid term of a visa required to stay in a foreign country as a tourist. Thus, it is possible to determine that the word has a characteristic which is attenuated approximately after three months have elapsed.

Furthermore, in the first embodiment, the language model which is adjusted based on a word appearance probability is assumed to be a unigram. Other than this, a bigram or a higher-order N-gram model may be used, based on the obtained word appearance probability as the language model which performs interpolation. Furthermore, when the N-gram class model, such as a parse class, is adopted as a language model, it is possible to adjust the N-gram class model using the obtained word appearance probability.

Furthermore, in the first embodiment, a criterion whether or not an obtained word, the auxiliary information, the elapsed time of the word, and the language model are deleted is determined based on whether or not the word appearance probability value is less than the predetermined threshold value. However, it is possible to delete words in an order of the low word appearance probability after the capacity of the storage units in the speech recognition device becomes full.

Second Embodiment

Next, the speech recognition device according to the second embodiment of the present invention is described with reference to FIG. 1, and FIGS. 6 to 7. The speech recognition device according to the second embodiment is embedded in a digital television receiving/recording apparatus, and is applied to the uses, such as searching for, video-recording, or reproducing of a television program, using an EPG operated by the user. Furthermore, it recognizes speech including a name of a program or a cast member uttered by the user for the aforementioned uses. The configuration of this speech recognition device is functionally the same as the one in the first embodiment. Note that the second embodiment differs from the first embodiment in that specific data, such as a time characteristic of a word appearance probability stored in the word appearance probability time characteristic storage unit 106 is intended for the use of a digital television receiving/recording apparatus. The following mainly describes the difference with the first embodiment.

The obtained word signal receiving/analyzing unit 105 which obtains a word information signal from outside the speech recognition device 100 is configured of, for example, a broadcast signal receiving device and a Internet connection device for obtaining an EPG data signal including a name of a television program and a cast member. Furthermore, it has a function of extracting, from the obtained EPG data, words usefully used for operations such as searching for, video-recording, or reproducing of a television program including a name of a television program and a cast member. After receiving and analyzing the obtained word signal, this obtained word signal receiving/analyzing unit 105 extracts a word and the auxiliary information, and stores the obtained word in the obtained word storage unit 107 and the auxiliary information in the obtained word auxiliary information storage unit 108. Furthermore, when receiving the obtained word signal, the obtained word signal receiving/analyzing unit 105 transmits the word obtainment time signal indicating the time when the word has been obtained to the post-obtainment passage time measurement unit 109. The post-obtainment elapsed time measurement unit 109 measures the time elapsed after obtaining the word, based on the word obtainment time signal, and holds it as the post-obtainment elapsed time.

FIG. 6 specifically shows an example of obtained words stored in the obtained word storage unit 107, the auxiliary information stored in the obtained word auxiliary information storage unit 108, and the post-obtainment elapsed time measured and held by the post-obtainment elapsed time measurement unit. Here, all of the obtained words are television program names, and as the auxiliary information, one of "semantic category: program name to be broadcasted during this week", "semantic category: program name to be broadcasted during next week", and "semantic category: program name to be broadcasted during next month" is attached to each of the program names.

Figure 7:
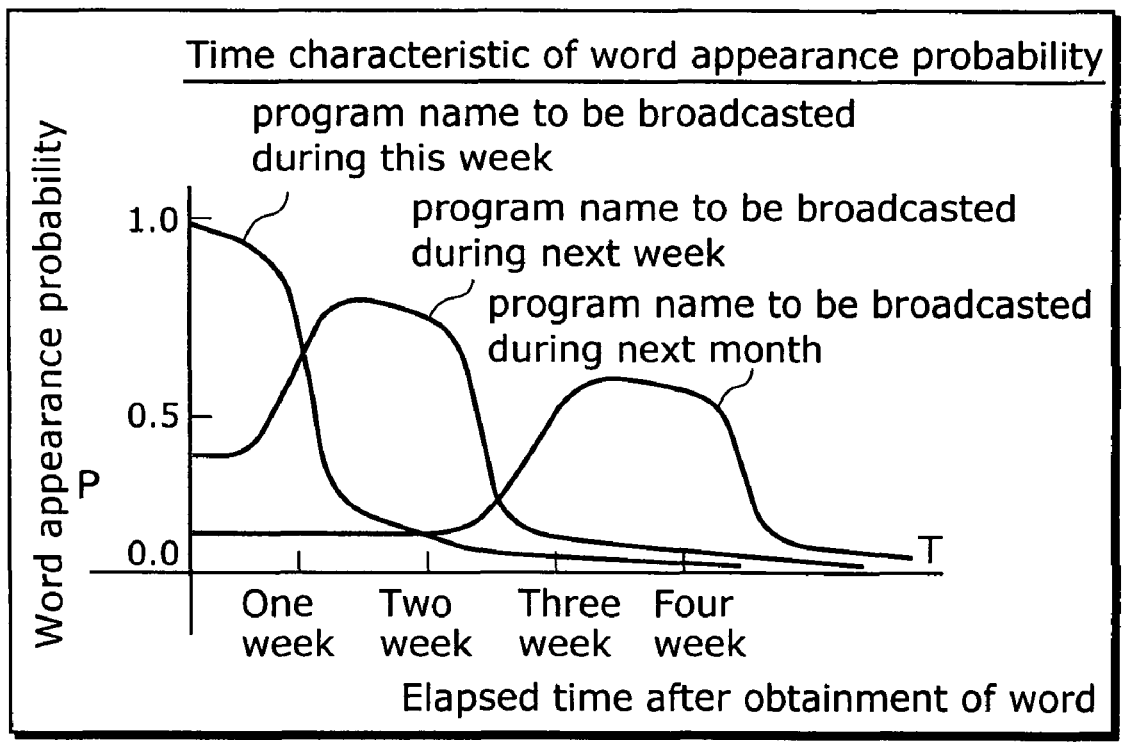
FIG. 7 is a diagram showing an example of the time characteristics stored in the word appearance probability time characteristic storage unit in the speech recognition device according to the second embodiment of the present invention.
Figure 8:
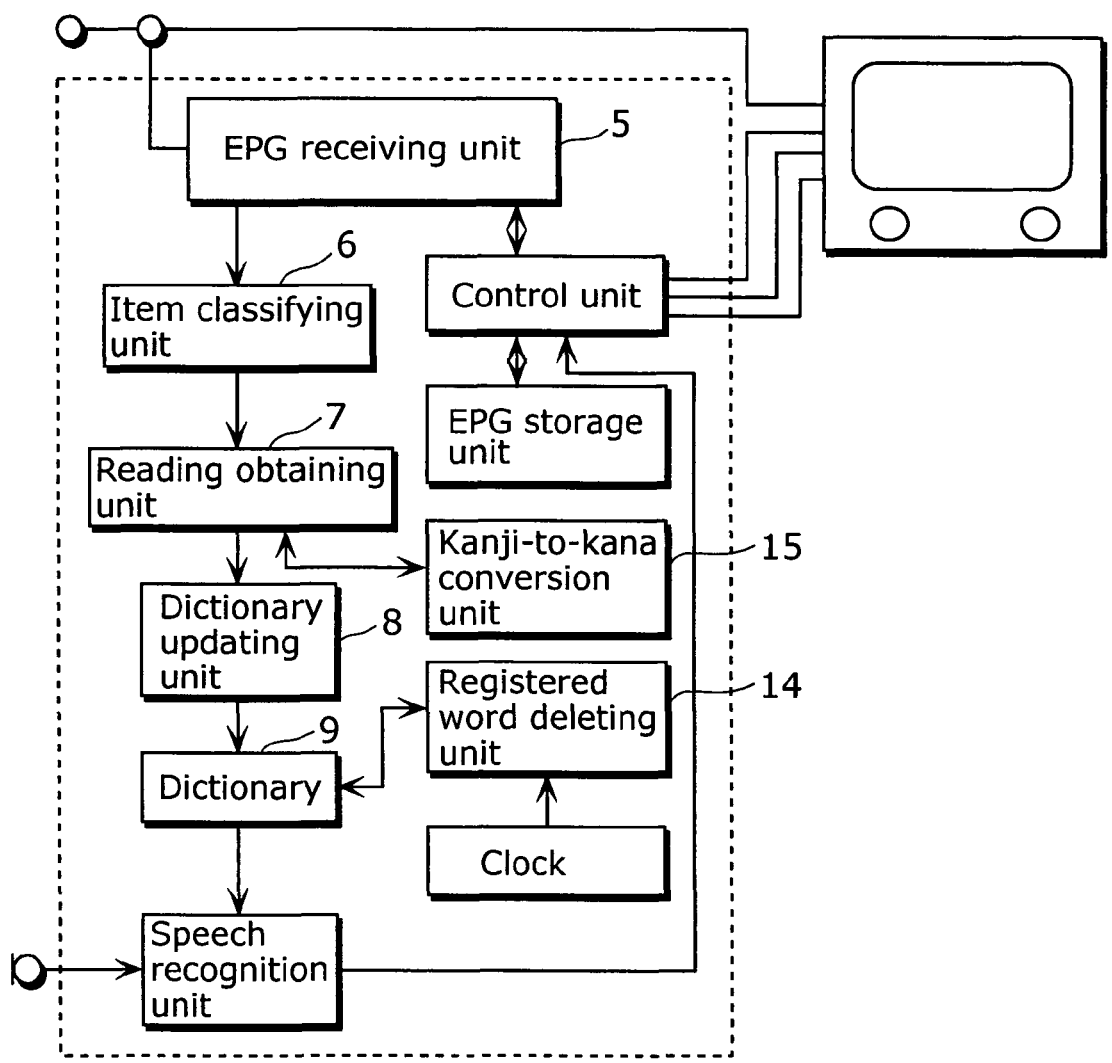
FIG. 8 is a block diagram showing the configuration of the conventional speech recognition device.

FIG. 7 shows an example of time characteristics for each auxiliary information of the obtained words which are stored in the word appearance probability time characteristic storage unit 106 in advance. When a desired television program is searched, recorded, or reproduced, using an EPG, for example, information indicating a period when the user frequently performs the operation of recording a television program to be broadcasted one week later can be learned in advance. Thus, the time characteristic can be determined based on such information of the period when the user operates the EPG.

For example, it is assumed that the operation of EPG, including searching, video-recording, and reproducing of a program to be broadcasted during this week, is performed for one to two weeks immediately after obtaining the word. Thus, the time characteristic of a word which belongs to the auxiliary information "semantic category: program name to be broadcasted during this week" has such characteristic corresponding to the time characteristic of the operation performed by the user.

On the other hand, it is conceivable that the EPG operation regarding a program to be broadcasted next month is frequently performed in two weeks or more later closer to the date when the program is broadcasted after obtaining the words. Thus, the time characteristic of the word which belongs to the auxiliary information "semantic category: program name to be broadcasted during next month" has such characteristic corresponding to the time characteristic of the operation performed by the user. Here, as shown in FIG. 7, the word appearance probability has a feature that is expressed by a smooth curve and is peaked (becomes highest) after a predetermined time has elapsed. More specifically, the television program "opening ceremony of the Olympics" which belongs to "semantic category: program name to be broadcasted during next month" is to be broadcasted one month later when the word is obtained. Thus, it is less likely that the program is to be searched or recorded by the user at the current point in time. Therefore, it becomes possible to maintain high recognition performance in a whole speech recognition device by setting a word appearance probability value of a program to be broadcasted next month which is less than that of a program name to be broadcasted during this week and next week. When three weeks have elapsed since obtaining the word and the Olympic is to be held soon, it is highly possible that the user searches for and records the program "opening ceremony of the Olympics". Thus, it is possible to make, higher, the word appearance probability value of the program name "opening ceremony of the Olympics" which belongs to "semantic category: program name to be broadcasted during next month", by setting the word appearance probability value corresponding to the aforementioned category higher. At this time, it is conceivable that the probability of the searching and reproducing operations of the user is lowered, after the television program which belongs to the auxiliary information "semantic category: program name to be broadcasted during this week" has already been broadcasted and a predetermined time has elapsed. Thus, it is possible to make, lower, the word appearance probability value of the word which belongs to the auxiliary information "semantic category: program name to be broadcasted during this week". Furthermore, it is possible to appropriately limit the words to be recognized by adjusting the language model based on the word appearance probability per auxiliary information regarding a television program.

Note that the present embodiment differs from the first embodiment in that a time characteristic stored in the word appearance probability time characteristic storage unit 106 is expressed by not a simply decreasing curve but a curve which is peaked after a predetermined time. Other than that, the processing performed in other units is the same as shown in the first embodiment. Thus, in the present embodiment, as shown in FIG. 7, the word appearance probability time characteristic storage unit 106 has a characteristic in that a word appearance probability is maximized after a predetermined time after obtaining the word. Thus, this language model adjusting unit 110 adjusts the language model by varying it so as to maximize the word appearance probability after the predetermined time elapsed after obtaining the word. Note that when the word appearance probability becomes less than the predetermined value, the language model adjusting unit 110 take, into accounts, not only a value of the word appearance probability but also the direction of change in the value (exceeding and becomes lower than the threshold value) in order to obtain the time when a word, the auxiliary information, the elapsed time, and the language model are deleted respectively from the obtained word storage unit 107, the obtained word auxiliary information storage unit 108, the post-obtainment elapsed time measurement unit 109, and the language model storage unit 104. In other words, after a word appearance probability which is the higher value than the threshold becomes less than the threshold, such information is deleted.

As such, by continuously adjusting the word appearance probability indicated by the language model according to the elapsed time, it is possible to prevent the words which have been recognized up to a certain time from not being recognized suddenly as shown in the conventional technology. Furthermore, according to the present invention, even when a word has a low word appearance probability in obtaining a word, it becomes possible to set the word appearance probability of the word higher when the utterance frequency of the word becomes higher. Furthermore, it becomes possible to limit the word to be recognized more appropriately, and to eliminate the uncomfortable feeling of the user caused by limiting the words to be recognized.

INDUSTRIAL APPLICABILITY

The present invention is useful as a speech recognition device, for example: as a speech recognition device for a car navigation system which recognizes facility names and place names in the vicinity of a current location as target words to be recognized; as a speech recognition device for a digital television which extracts program names, cast members, and the like from EPG data obtained via a broadcasting network and recognizes these words as target words to be recognized; and as a speech recognition device for an information terminal which recognizes product names of a shop where a user stops by and the brand names as target words to be recognized.

The invention claimed is:

1. A speech recognition device which recognizes a speech signal and outputs a result of the recognition, said speech recognition device comprising:
   a language model storage unit which stores a language model indicating appearance probabilities of words or word sequences;
   a recognition unit which: extracts a feature amount of the inputted speech signal; identifies a word or word sequence corresponding to the speech signal by checking the extracted feature amount with the language model stored in said language model storage unit; and outputs the identified word or word sequence as the result of the speech recognition;
   a word obtaining unit which obtains a word from outside said speech recognition device; and
   a language model adjusting unit which adjusts using a processor, the language model by varying the appearance probability indicated by the language model according to time elapsed after said word obtaining unit obtains the word so as to maximize the appearance probability after a predetermined elapsed time,
   wherein said recognition unit identifies the word or the word sequence using the language model adjusted by said language model adjusting unit.

2. The speech recognition device according to claim 1,
   wherein said word obtaining unit obtains information indicating a semantic category of the word as auxiliary information of the word, and
   said language model adjusting unit varies the appearance probability indicated by the language model for each semantic category indicated by the auxiliary information.

3. The speech recognition device according to claim 1,
   wherein said word obtaining unit obtains, as the auxiliary information, information indicating a place in which the word has been obtained, and
   said language model adjusting unit varies the appearance probability indicated by the language model for each of the places indicated by the auxiliary information.

4. The speech recognition device according to claim 1,
   wherein said word obtaining unit obtains auxiliary information indicating an auxiliary item to be attached to the word, together with the word, and
   said language model adjusting unit includes:
   a word appearance probability time characteristic storage unit which stores, for each auxiliary information, a time characteristic of a word appearance probability which indicates how the word appearance probability of the word varies according to time elapsed after obtaining the word;
   a word storage unit which stores the word and the corresponding auxiliary information in association with each other, the word being obtained by said word obtaining unit;
   an elapsed time measurement unit which measures, for each word, time elapsed after said word obtaining unit obtains the word; and
   an adjusting unit which: identifies, from the time characteristics stored in said word appearance probability time characteristic storage unit, a time characteristic corresponding to the auxiliary information of the word stored in said word obtaining unit;
   identifies a word appearance probability corresponding to the elapsed time of the word measured by said elapsed time measurement unit, using the identified time characteristic of the word appearance probability; and adjusts the language model, using the identified appearance probability.

5. The speech recognition device according to claim 4,
   wherein, when the identified word appearance probability of the word is less than a predetermined value, said adjusting unit deletes one of or all of: the words stored in said word storage unit; the auxiliary information of the words; the elapsed time of the words stored in said elapsed time measurement unit; and the language models of the words stored in said language model storage unit.

6. A method of recognizing speech using a language model storage unit which stores a language model indicating appearance probabilities of words or word sequences, said method comprising:
   a recognition step of: extracting, using a recognition unit, a feature amount of the inputted speech signal; identifying, using the recognition unit, a word or word sequence corresponding to the speech signal by checking the extracted feature amount with the language model stored in said language model storage step; and outputting, using the recognition unit, the identified word or word sequence as the result of the speech recognition;
   a word obtaining step of obtaining, using a word obtaining unit, a word from outside; and
   a language model adjusting step of adjusting, using a processor, the language model by varying the appearance probability indicated by the language model according to time elapsed after the word is obtained in said word obtaining step so as to maximize the appearance probability after a predetermined elapsed time, wherein in said recognition step, the word or the word sequence is identified using the language model adjusted in said language model adjusting step.

7. A non-transitory computer-readable medium, having a program stored thereon, the program being for a speech recognition device including a language model storage unit which stores a language model indicating appearance probabilities of words or word sequences, said program causing a computer to execute a method comprising:

a recognition step of: extracting, using a recognition unit, a feature amount of the inputted speech signal; identifying, using the recognition unit, a word or word sequence corresponding to the speech signal by checking the extracted feature amount with the language model stored in said language model storage step; and outputting, using the recognition unit, the identified word or word sequence as the result of the speech recognition;

a word obtaining step of obtaining, using a word obtaining unit, a word from outside; and a language model adjusting step of adjusting, using a language model adjusting unit, the language model by varying the appearance probability indicated by the language model according to time elapsed after the word is obtained in said word obtaining step so as to maximize the appearance probability after a predetermined elapsed time, wherein in said recognition step, the word or the word sequence is identified using the language model adjusted in said language model adjusting step.

\* \* \* \* \*